United States Patent
Kanakarajan

(10) Patent No.: US 10,063,415 B1
(45) Date of Patent: Aug. 28, 2018

(54) NETWORK SERVICES USING POOLS OF PRE-CONFIGURED VIRTUALIZED NETWORK FUNCTIONS AND SERVICE CHAINS

(71) Applicant: Juniper Networks, Inc., Sunnyvale, CA (US)

(72) Inventor: Ravindranath C. Kanakarajan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 214 days.

(21) Appl. No.: 15/197,754

(22) Filed: Jun. 29, 2016

(51) Int. Cl.
G06F 15/177 (2006.01)
H04L 12/24 (2006.01)
H04L 29/08 (2006.01)

(52) U.S. Cl.
CPC ........ H04L 41/083 (2013.01); H04L 41/0806 (2013.01); H04L 41/5054 (2013.01); H04L 67/16 (2013.01)

(58) Field of Classification Search
CPC ... H04L 41/083; H04L 41/5054; H04L 67/16; H04L 41/0806
See application file for complete search history.

(56) References Cited

U.S. PATENT DOCUMENTS

2017/0134287 A1* 5/2017 Shaw .................... H04L 47/125
2017/0279923 A1* 9/2017 Kumar .................. H04L 67/327
2017/0295409 A1* 10/2017 Simon ............... H04N 21/64322
2017/0366428 A1* 12/2017 Shaw .................. H04L 43/0811

FOREIGN PATENT DOCUMENTS

WO 2013184846 A1 12/2013

OTHER PUBLICATIONS

"ETSI GS NFV-MAN 001, Network Functions Virtualisation (NFV) Management and Orchestration," European Telecommunications Standards Institute, Dec. 2014, 184 pp.

* cited by examiner

Primary Examiner — Krisna Lim
(74) Attorney, Agent, or Firm — Shumaker & Sieffert, P.A.

(57) ABSTRACT

Techniques are disclosed for reducing the time required to instantiate network services in a service provider network to service requests by subscriber devices. In one example, an orchestration engine pre-creates pools of different virtual network functions (VNFs). Upon receiving a request to service network traffic from a subscriber device, the orchestration engine dynamically creates a service chain using the appropriate VNFs from the pools of different VNFs. In another example, the orchestration engine pre-creates pools of common service chains. Upon receiving a request to service network traffic from a subscriber device, the orchestration engine selects the appropriate service chain from the pools of service chains. After configuring the service chain, the orchestration engine issues instructions to a Software-Defined Networking (SDN) controller causing the SDN controller to update forwarding information in the service provider network to enable the service chain to service the subscriber traffic.

22 Claims, 7 Drawing Sheets

NETWORK SERVICES USING POOLS OF PRE-CONFIGURED VIRTUALIZED NETWORK FUNCTIONS AND SERVICE CHAINS

TECHNICAL FIELD

The disclosure relates to computer networks and, more specifically, to application of network services to service subscriber data traffic traversing computer networks.

BACKGROUND

Network service providers are increasingly providing network services such as security, tunneling, virtual private networks, filtering, load-balancing. VoIP/Multimedia processing and various types of application proxies (HTTP, XML, WAP, etc.) to packet flows from customer devices. Service providers also provide content-specific services designed to improve the quality of a user's experience, for example, video streaming and caching. To provide these new services, service providers have often turned to specialized, dedicated physical or virtual appliances. In some cases, routers or other network device have been modified to include additional hardware or software that applies various services to the incoming packets. For example, line cards installed in a service plane of a router may be configured to perform particular services, such as the services described above. In other example, service providers have deployed sophisticated service complex of specialized physical and/or virtual appliances to apply services to customer packet flows.

In some example implementations, physical and/or virtual appliances of the service complex are configured in the form of service chains that provide network services to customer packet flows. In a typical network deployment, instantiation of service nodes executing virtual machines (VMs) implementing virtual network functions (VNFs) to create a service chain providing the requisite network function may take anywhere from ten minutes to multiple hours, depending upon complexity and the particular network environment. This onerous start-up time negatively impacts the experience of the end user. Each time a new service chain is created to handle traffic from a subscriber device, the end user is often forced to wait a long period for the new service chain to initialize.

SUMMARY

In general, the disclosure describes techniques for providing and leveraging pre-configured pools of service nodes and service chains that can be more quickly selected and utilized to provide network services when needed by subscribers. In one example, an orchestration engine initializes and configures a pool of service nodes implementing VNFs and service chains prior to an actual request for services by a subscriber device. Upon receiving the request, the orchestration engine issues instructions to a Software-defined Networking (SDN) controller to attach an appropriate service chain to provide a network function for handling the request for services.

More specifically, in one example, an orchestration engine pre-creates a plurality of pools of service nodes implementing different VNFs. Prior to receiving a request to service network traffic from a subscriber device, the orchestration engine spawns and initializes VMs executing the different VNFs one a plurality of service nodes and assigns the service nodes to a concomitant pool of the plurality of pools of service nodes, wherein each pool contains idle service nodes that perform a particular VNF. Upon receiving the request to service network traffic from the subscriber device, the orchestration engine determines the necessary VNFs to perform a composite network service to satisfy the request, selects the corresponding service nodes from the appropriate pools of service nodes, and dynamically creates a service chain using the selected service nodes. Further, the orchestration engine issues instructions to an SDN controller to updates forwarding information in the service complex to tie the input and egress of the service chain to the routing and switching infrastructure so as to service the network traffic of the subscriber device.

In another example, the orchestration engine pre-creates a plurality of pools of service chains. Prior to receiving a request to service network traffic from a subscriber device, the orchestration engine spawns and initializes a plurality of different VMs executing various VNFs on a plurality of service nodes. Further, the orchestration engine issues instructions to an SDN controller to stitch together the plurality of different service nodes to create a plurality of service chains capable of performing various network services. The orchestration engine assigns the plurality of different service chains to a concomitant pool of the plurality of pools of service chains. Upon receiving the request to service network traffic from the subscriber device, the orchestration engine determines the necessary service chain that performs a composite network service so as to satisfy the request and selects the corresponding service chain from the appropriate pool of the plurality of pools of service chains. Further, the orchestration engine issues instructions to the SDN controller to update forwarding information in the service complex to tie the input and egress of the service chain to the routing and switching infrastructure so as to service the network traffic of the subscriber device.

Such a plurality of "pools" of service nodes and service chains according to the disclosure may allow the orchestration engine to reduce the amount of time required to service a request from a subscriber device by pre-allocating resources to service the request. In other words, the techniques of the disclosure may allow a service provider network to establish pools of service nodes and service chains that the service provider network may draw from to satisfy requests for services. Thus, a service provider network as described herein may greatly decrease the time required by the service provider network to respond to service requests by shifting a majority of the time required to respond to the requests to pre-processing that occurs in advance of a service request from a subscriber device.

In one example, this disclosure describes a method including: prior to receiving network traffic from a subscriber device: spawning, by an orchestration engine of a service provider network, a plurality of virtual network functions (VNFs) executed by virtual machines on a plurality of service nodes; and assigning, by the orchestration engine, the plurality of service nodes to a plurality of service node pools; and in response to receiving a request to service network traffic from the subscriber device: selecting, by the orchestration engine, at least one service node from at least one service node pool of the plurality of service node pools; issuing instructions, by the orchestration engine, that cause an software-defined network (SDN) controller of the service provider network to attach the selected at least one service node to the switch fabric of the service provider network to form a service chain providing a network service; and issuing instructions, by the orchestration engine, that cause the SDN controller to direct network traffic through the service chain.

In another example, this disclosure describes a method including: prior to receiving network traffic from a subscriber device: spawning, by an orchestration engine of a service provider network, a plurality of virtual network functions (VNFs) executed by virtual machines on a plurality of service nodes; issuing instructions, by the orchestration engine, that cause a Software-defined Network (SDN) controller of the service provider network to attach the plurality of service nodes together to form a plurality of service chains providing a plurality of different network services; and assigning, by the orchestration engine, each of the plurality of service chains to a plurality of service chain pools, wherein each service chain pool of the plurality of service chain pools comprises service chains offering one network service of the plurality of different network services; and in response to receiving a request to service network traffic from the subscriber device: selecting, by the orchestration engine, a service chain from a service chain pool of the plurality of service chain pools; issuing instructions, by the orchestration engine, that cause the SDN controller to attach the selected service chain to the switch fabric of the service provider network; and issuing instructions, by the orchestration engine, that cause the SDN controller to direct network traffic through the service chain.

In another example, this disclosure describes an orchestration engine of a service provider network configured to: prior to receiving network traffic from a subscriber device: spawn a plurality of virtual network functions (VNFs) executed by virtual machines on a plurality of service nodes; and assign the plurality of service nodes to a plurality of service node pools; and in response to receiving a request to service network traffic from the subscriber device: select at least one service node from at least one service node pool of the plurality of service node pools; issue instructions that cause a Software-Defined Network (SDN) controller of the service provider network to attach the selected at least one service node to the switch fabric of the service provider network to form a service chain providing a network service; and issue instructions that cause the SDN controller to direct network traffic through the service chain.

In another example, this disclosure describes an orchestration engine of a service provider network configured to: prior to receiving network traffic from a subscriber device: spawn a plurality of virtual network functions (VNFs) executed by virtual machines on a plurality of service nodes; issue instructions that cause a Software-Defined Network (SDN) controller of the service provider network to attach the plurality of service nodes together to form a plurality of service chains providing a plurality of different network services; and assign each of the plurality of service chains to a plurality of service chain pools, wherein each service chain pool of the plurality of service chain pools comprises service chains offering one network service of the plurality of different network services, and in response to receiving a request to service network traffic from the subscriber device: select a service chain from a service chain pool of the plurality of service chain pools; issue instructions that cause the SDN controller to attach the selected service chain to the switch fabric of the service provider network; and issue instructions that cause the SDN controller to direct network traffic through the service chain.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
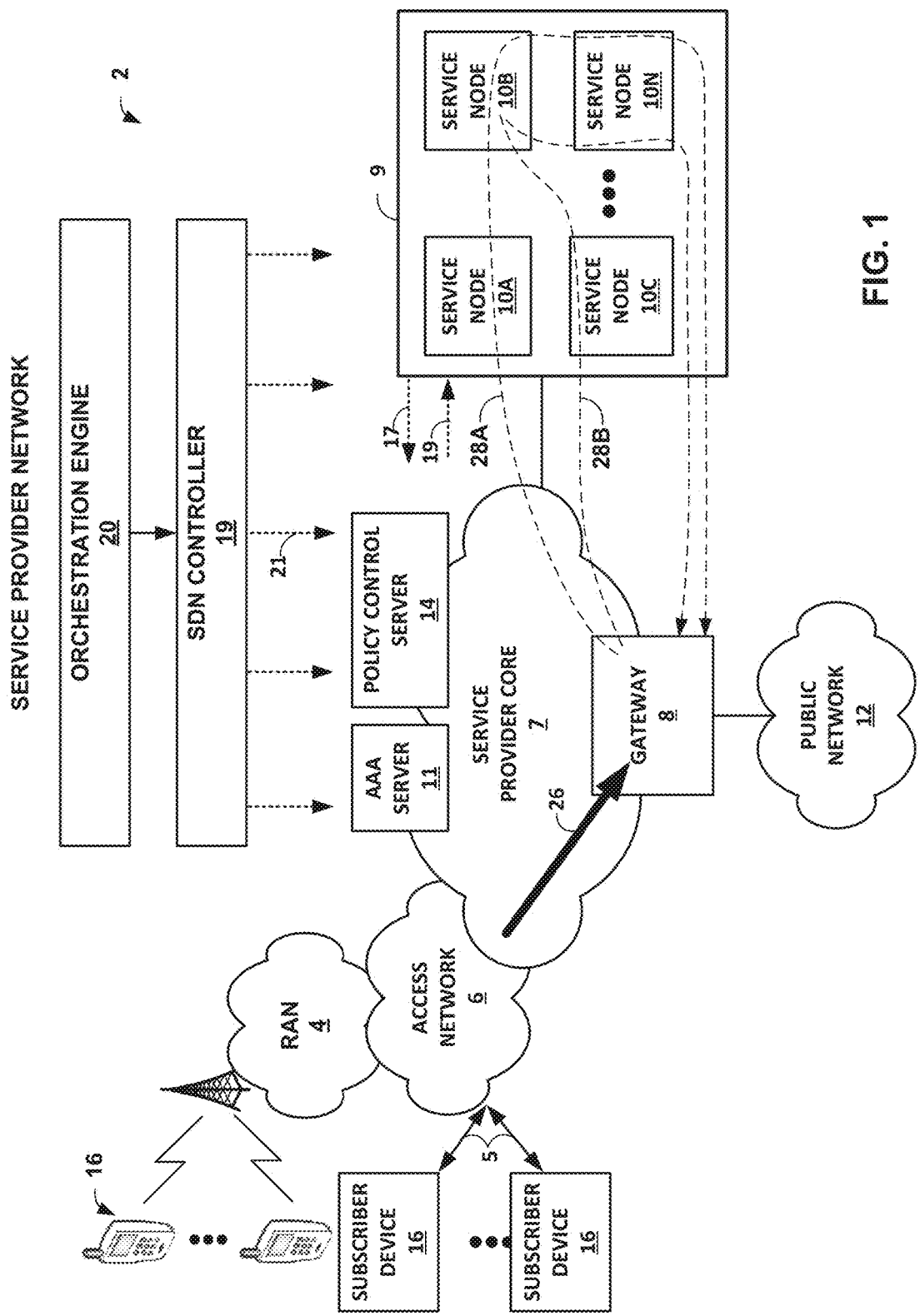
FIG. 1 is a block diagram illustrating an example network system operating in accordance with the techniques of the disclosure.

In a typical network deployment, network services are deployed when needed by one or more customers. As used herein, each "network service" is typically implemented as a service chain of individual network functions that each perform a different operation on a packet flow. That is, an overall "network service" is implemented as a "service chain" of a set of service nodes, each service node operating to provide a different virtualized network function (VNF). In this way, the service chain of VNFs applies the set of network functions in a particular order to provide a composite network service to packet flows bound to the service chain.

In typical network deployments, virtual network function (VNF) boot and initialization may take the majority of time for responding to a request for services from a subscriber device. In one example, when allocating a network service, a service provider network receives a request for services from a customer having one or more subscriber devices. An orchestration engine within the service provider network, such as a Network Functions Virtualisation (NFV) Management and Orchestration Engine, spawns one or more virtual machines (VMs), each corresponding to a particular VNF. The spawning of the VMs to instantiate the VNFs may take between five to ten minutes. Next, the orchestration engine issues instructions to an SDN controller that cause the SDN controller to update forwarding information within an underlying switch fabric so as to logically connect the spawned VMs together along a path, thereby forming the service chain. An Enterprise Management System (EMS) may take between one minute and one hour to discover each of the instantiated VNFs. After connecting the VMs along the service chain, the orchestration engine initializes and applies function-independent configurations to each of the VMs. Further, the orchestration engine applies service-specific configuration and functionality to each of the VNFs of the VMs. The orchestration engine may take less than a minute to apply subscriber-specific configurations to each of the VNFs. Finally, the orchestration engine issues instructions to the SDN controller that cause the SDN controller to update the underlying switch fabric to tie the service chain to the incoming traffic via so as to provide the network service to packet flows for the particular subscriber devices of the customer.

As a further example, when terminating a network service, the orchestration engine issues instructions to the SDN controller causing the SDN controller to program the SDN gateway to stop steering the incoming traffic to the service chain. After redirecting the traffic, the orchestration engine issues instructions to the SDN controller causing the SDN controller to detach the service chain from the SDN gateway. The orchestration engine removes service-specific configuration and functionality from each of the VNFs. Finally, the orchestration engine terminates each of the corresponding VMs.

Accordingly, instantiation of network services by deploying and configuring the necessary VNFs on demand, as well as updating forwarding and interconnect information within the switching & routing fabric of a service complex so as to stitch the VNFs together and form an overall service chain, takes significant time and resources. In many cases, instantiation of a requested network service may take anywhere from several minutes to multiple hours, depending upon complexity of the service chain and the particular network environment. This onerous start-up time negatively impacts the experience of the end user. This may be particularly noticeable when a customer administrator is experimenting with different service chains to select a service chain for his network. For example, this wait period may be most noticeable when a user is waiting to see a product demonstration or when the user is experimenting with or testing VNFs from a catalog of different network services. Each time a new service chain is created to handle traffic from one or more subscriber devices, the administrator must wait a long period for the new service chain to initialize before he can begin testing it. Thus, this extensive time period may negatively impact the experience of a user accessing the system. Furthermore, attempting to minimize this wait period by instructing the orchestration engine to aggressively poll a virtual infrastructure manager (VIM) and a virtual network functions manager (VNFM) results in increased overhead and resource consumption which may further negatively impact the experience of the user.

To address this deficiency, the disclosure describes techniques for providing and leveraging pre-configured pools of service nodes and service chains that can be more quickly selected and utilized to provide composite network services when needed by subscribers. In one example, an orchestration engine pre-creates a plurality of pools of different VNFs. Prior to receiving a request to service network traffic from a subscriber device, the orchestration engine spawns and initializes the different VNFs and assigns the VNFs to a concomitant pool of the plurality of pools of VNFs, wherein each pool contains idle VNFs that perform a particular function. Upon receiving the request to service network traffic from the subscriber device, the orchestration engine determines the necessary VNFs to perform a composite network service to satisfy the request, selects the corresponding VNFs from the appropriate pools of VNFs, and dynamically creates a service chain using the selected VNFs. Further, the orchestration engine issues instructions to an SDN controller to update forwarding information in the service complex to tie the input and egress of the service chain to the routing and switching infrastructure so as to service the network traffic of the subscriber device.

In another example, the orchestration engine pre-creates a plurality of pools of service chains. Prior to receiving a request to service network traffic from a subscriber device, the orchestration engine spawns and initializes a plurality of different VNFs. Further, the orchestration engine issues instructions causing the SDN controller to stitch together the plurality of different VNFs to create a plurality of service chains capable of performing various network services. The orchestration engine assigns the plurality of different service chains to a concomitant pool of the plurality of pools of service chains. Upon receiving the request to service network traffic from the subscriber device, the orchestration engine determines the necessary service chain that performs a composite network service so as to satisfy the request and selects the corresponding service chain from the appropriate pool of the plurality of pools of service chains. Further, the orchestration engine issues instructions to the SDN controller to update forwarding information in the service complex to tie the input and egress of the service chain to the routing and switching infrastructure so as to service the network traffic of the subscriber device.

FIG. 1 is a block diagram illustrating an example network system operating in accordance with the techniques of the disclosure. The example network system of FIG. 1 includes a service provider network 2 that operates as a private network to provide packet-based network services to subscriber devices 16A-16N (collectively, "subscriber devices 16"). That is, service provider network 2 provides authentication and establishment of network access for subscriber devices 16 such that the subscriber device may begin exchanging data packets with public network 12, which may be an internal or external packet-based network such as the Internet.

In the example of FIG. 1, service provider network 2 comprises access network 6 ("access network 6") that provides connectivity to packet data network (PDN) 12 via service provider core network 7 and gateway 8. Service provider core network 7 and public network 12 provide packet-based services that are available for request and use by subscriber devices subscriber devices 16. As examples, core network 7 and/or PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Subscriber devices 16 connect to gateway 8 via access network 6 to receive connectivity to subscriber services for applications hosted by subscriber devices 16. A subscriber may represent, for instance, an enterprise, a residential subscriber, or a mobile subscriber. Subscriber devices 16 may be, for example, personal computers, laptop computers or other types of computing device associated with subscribers. In addition, subscriber devices 16 may comprise mobile devices that access the data services of service provider network 2 via radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like. Each of subscriber devices 16 may run a variety of software applications, such as word processing and other office support software, web browsing software, software to support voice calls, video games, videoconferencing, and email, among others. Subscriber devices 16 connect to access network 6 via access links 5 that comprise wired and/or wireless communication link. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 8. Access network 6 represents a network that aggregates data traffic from one or more subscribers for transport to/from service provider core network 7 of the service provider. Access network 6 includes network nodes that execute communication protocols to transport control and user data to facilitate communication between subscriber devices 16 and gateway 8. Access network 6 may include a broadband access network, network, a wireless LAN, a public switched telephone network (PSTN), or other type of access network, and may include or otherwise provide connectivity for cellular access networks, such as radio access network (RAN) 4 of FIG. 1. Examples of include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the 3rd Generation Partnership Project (3GPP), 3rd Generation Partnership Project 2 (3GGP/2) and the Worldwide Interoperability for Microwave Access (WiMAX) forum.

Service provider core network 7 (hereinafter, "core network 7") offers packet-based connectivity to subscriber devices 16A-16M attached to access network 6 for accessing PDN 12. Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. PDN 12 may represent an edge network coupled to core network 7, e.g., by a customer edge device such as customer edge switch or router. PDN 12 may include a data center.

In examples of network 2 that include a wireline/broadband access network, gateway 8 may represent a Broadband Network Gateway (BNG), a Broadband Remote Access Server (BRAS), MPLS Provider Edge (PE) router, core router or gateway, or a Cable Modem Termination System (CMTS), for instance. In examples of network 2 that include a cellular access network as access network 6, gateway 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to gateway 8 may be implemented in a switch, service card or other network element or component.

A network service provider that administers at least parts of network 2 typically offers services to subscribers associated with devices, e.g., subscriber devices 16, that access the service provider network. Services offered may include, for example, traditional Internet access, Voice-over-Internet Protocol (VoIP), video and multimedia services, and security services. As described above with respect to access network 6, core network 7 may support multiple types of access network infrastructures that connect to service provider network access gateways to provide access to the offered services. In some instances, network system may include subscriber devices 16 that attach to multiple different access networks 6 having varying architectures.

In general, any one or more of subscriber devices 16 may request authorization and data services by sending a session request to gateway 8. In turn, gateway 8 typically accesses Authentication, Authorization and Accounting (AAA) server 11 to authenticate the subscriber device requesting network access. Once authenticated, any of subscriber devices 16 may send subscriber data traffic toward service provider core network 7 in order to access and receive services provided by public network 12, and such packets traverse gateway 8 as part of at least one packet flow. Flows 26 illustrated in FIG. 1 represent one or more upstream packet flows from any one or more subscriber devices 16 and directed to PDN 12. The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device may originate multiple packet flows upon authenticating to service provider network 2 and establishing a communication session for receiving data services.

As described herein, service provider network 2 includes an orchestration engine 20 that manages functions of service provider network 2 such as compute, storage, networking, and application resources. For example, orchestration engine 20 may create a virtual network for a tenant within service provider network 2 or across data centers. Orchestration engine 20 may attach virtual machines (VMs) to a tenant's virtual network. Orchestration engine 20 may connect a tenant's virtual network to some external network, e.g. the Internet or a VPN. Orchestration engine 20 may implement a security policy across a group of VMs or to the boundary of a tenant's network. Orchestration engine 20 may deploy a network service (e.g. a load balancer) in a tenant's virtual network. Further example details of an orchestration engine are described in ETSI GS NFV-MAN 001, Network Functions Virtualisation (NFV) Management and Orchestration, dated December 2014, the entire contents of which are incorporated herein by reference.

Service provider network 2 further includes an SDN controller 19 that manages the network and networking services such load balancing, security, and allocate resources from service nodes 10 to various subscriber applications via a southbound API 21. That is, southbound API 21 represents a set of communication protocols utilized by SDN controller 19 to make the actual state of the network equal to the desired state as specified by orchestration engine 20. For example, SDN controller 19 implements high-level requests from orchestration engine 20 by configuring physical switches, e.g. TOR switches, chassis switches, and switch fabric of service provider core 7; physical routers; physical service nodes such as firewalls and load balancers; and virtual services such as virtual firewalls in a VM. SDN controller 19 maintains routing, networking, and configuration information within a state database.

As described herein, service provider network 2 includes a services complex 9 having a cluster of service nodes 10A-10N that each provide an execution environment for a respective virtualized network function (VNF) that may be linked together to for service chains for providing network services. That is, each of service nodes 10 apply one or more VNFs, and a set of VNFs may be logically linked together along a forwarding path to perform a requested network service. As examples, service nodes 10 may apply firewall and security services, carrier grade network address translation (CG-NAT), media optimization (voice/video), IPSec/VPN services, deep packet inspection (DPI), HTTP filtering, session border controller (SBC), counting, accounting, charging, and load balancing of packet flows or other types of services applied to network traffic. Each of service nodes 10 in this way represents a service instance.

Although illustrated as part of a services complex 9, which may represent a data center, service nodes 10 may, for instance, be interconnected by a switch fabric of routers, switches and/or virtual switches of core network 7 that forward packets according to programmable forwarding information. In one example, each of service nodes 10 may run as virtual machines in virtual compute environment. Moreover, the compute environment may comprise a scalable cluster of general computing devices, such as x86 processor-based servers. As another example, service nodes 10 may comprise a combination of general purpose computing devices and special purpose appliances. As virtualized, individual virtualized network functions provided by service nodes 10 can scale just as in a modern data center, through the allocation of virtualized memory, processor utilization, storage and network policies, as well as horizontally by adding additional load-balanced virtual machines.

As shown in FIG. 1, SDN controller 19 steers individual subscriber packet flows 26 through defined sets of virtualized network functions provided by individual service nodes 10. That is, each subscriber packet flow may be forwarded through a particular ordered combination of VNFs provided by service nodes 10, each ordered set of VNFs being referred to herein as a "service chain" that provides an overall network service. In the example of FIG. 1, one or more subscriber packet flows 26 are directed along a first service chain 28A and, therefore, receive a sequence of VNFs applied by service nodes 10A, 10B and 10N, in that order. Similarly, one or more subscriber packet flows 26 are directed along a second service chain 28B and, therefore, receive VNFs applied by service nodes 10C, 10B and 10N.

In this way, subscriber flows 26 may be processed by service nodes 10 as the packets flow between access network 6 and public network 12 according to service chains configured by the service provider. In the illustrated example, service chain 28A identifies the ordered set of nodes 10A, 10B, and 10N according to the listed ordering. Service chain 28B identifies the ordered set of nodes 10C, 10B and 10N. Accordingly, packet flows 26 processed according to service chain 28A follow a service path that traverses nodes 10A, 10B, and finally node 10N as the terminal node for the service chain 28A. A particular node 10 may support multiple service chains. In this example, service node 10B supports service chains 28A, 28B.

Once processed at a terminal node of the service chain, i.e., the last node 10 to apply services to packets flowing along a particular service path, the terminal node may direct the traffic back to gateway 8 for further processing and/or forwarding to public network 12. For example, traffic engineered service paths may start and terminate with gateway 8.

Whereas a "service chain" defines one or more virtualized network functions to be applied in a particular order to provide a composite service for application to packet flows bound to the service chain, a "service tunnel" or "service path" refers to a logical and/or physical path taken by packet flows processed by a service chain along with the forwarding state within the underlying switch fabric for forwarding packet flows according to the service chain ordering. Each service chain may be associated with a respective service tunnel, and packet flows associated with each subscriber device 16 flow along service tunnels in accordance with a service profile associated with the respective subscriber. The arrows denoted as service chains 28A, 28B illustrate respective paths taken by packet flows mapped to the service chains 28A or 28B. For example, a given subscriber may be associated with a particular service profile, which in turn is mapped to a service tunnel associated with service chain 28A. Similarly, another subscriber may be associated with a different service profile, which in turn is mapped to a service tunnel associated with service chain 28B. Gateway 8, after authenticating and establishing access sessions for the subscribers, directs packet flows for the subscribers along the appropriate service tunnels, thereby causing service complex 9 to apply the requisite ordered VNFs for the given subscriber.

Nodes 10 may implement service chains 28A, 28B using internally configured forwarding state that directs packets of the packet flow long the service chains 28A, 28B for processing according to the identified set of service nodes 10. Such forwarding state may specify tunnel interfaces for tunneling between service nodes 10 using network tunnels such as Internet Protocol (IP) or Generic Route Encapsulation (GRE) tunnels, or by using Virtual Local Area Networks (VLANs), Multiprotocol Label Switching (MPLS) techniques, and so forth. In some instances, real or virtual switches, routers or other network elements that interconnect connect service nodes 10 may be configured to direct packet flow to the service nodes 10 according to service chains 28A, 28B.

In FIG. 1, software-defined networking (SDN) controller 19 provides a high-level controller for configuring and managing routing and switching infrastructure of service provider network 2 (e.g., gateway 8, core network 7 and nodes 10). In some instances, SDN controller 19 manages deployment of virtual machines within the operating environment of value-added services complex 9. For example, SDN controller 19 may interact with gateway 8 to specify service chain 28A, 28B information. For example, the service chain information provided by SDN controller 19 may specify any combination and ordering of value-added VNFs provided by service nodes 10, traffic engineering information (e.g., labels or next hops) for tunneling or otherwise transporting (e.g., MPLS or IP tunnels) packet flows along service paths, rate limits, Type Of Service (TOS) markings or packet classifiers that specify criteria for matching packet flows to a particular service chain 28A, 28B. Further example details of an SDN controller are described in PCT International Patent Application PCT/US 13/44378, filed Jun. 5, 2013, the entire contents of which are incorporated herein by reference.

In one example implementation, gateway 8 modifies packets of packet flows 26 as the gateway 8 steers the packets into appropriate service chains. For example, gateway 8 may prepend to each subscriber packet a traffic engineering header or label (e.g., an additional IP header or MPLS label) to form a "tunnel packet" in which the subscriber packet is encapsulated as a payload. At this time, gateway 8 selects the particular traffic engineering header based on the particular subscriber and, more specifically, selects the service chain to which the particular type of packet flow for the given subscriber is assigned. In other words, the processing of subscriber packet flows 26 by gateway 8 to steer the packet flows is session-aware (i.e., based on the particular subscriber from which the packet flow originated) and may also be based on characteristics of the packet flow itself, e.g., type of flow (e.g., VoIP, HTTP, etc.).

In some implementations, individual service nodes 10 may dynamically store subscriber-specific information to and/or retrieve subscriber-specific information for other network elements of service provider network 2. For example, as shown in FIG. 1, any of service nodes 10 may issue queries 17 and receive responses 19 from other network elements, such as AAA server 11, policy control server 14, SDN controller 19, and/or orchestration engine 20. In this way, service nodes 10 leverage the authorization process performed between gateway 8 and AAA server 11, thereby allowing for delegation of parts of session-aware service enforcement to service nodes 10 without requiring the service nodes to interact on a per session-basis with subscriber control systems.

In some examples, each service chain may apply stateful network services in which the processing of a given packet in a packet flow may be dependent upon the processing of previous packets for that packet flow, and may create state used when processing subsequent packets for the packet flow. In some cases, application of the networks services may result in modification of the subscriber packets, such as NAT or application proxy services, and the system may allow downstream service nodes to nevertheless efficiently resolve the subscriber packet flows to subscriber-specific requirements. Other examples of network services may not necessarily result in modification of the subscriber packets, such as accounting, charging, and load balancing services.

According to the techniques of the disclosure, service provider network 7 maintains and utilizes pools of service nodes that have been pre-configured with specific VNFs and that can be selectively deployed on demand so as to reduce the time required to instantiate network services to service requests by subscriber device 16. In one example implementation, orchestration engine 20 pre-creates a plurality of pools, each pool associated with a different individual VNF and containing a set of service nodes that are pre-configured with an executable image for implementing that corresponding VNF of the respective pool. For example, a first pool may contain a set of service nodes 10 that are each pre-configured with an executable image and booted to an operational state for implementing a first VNF, such as HTTP filtering. A second pool may contain a different set of service nodes 10 that are each pre-configured with an executable image and booted to an operational state for implementing a second VNF, such as IDP. Additional pools may be maintained in this manner. Upon receiving a request for network services from subscriber device 16, orchestration engine 20 determines the necessary service nodes 10 required to satisfy the request, selects the corresponding service nodes 10 from the pool necessary to perform VNFs for the requested service, and issues instructions causing SDN controller 19 to dynamically update the forwarding state of the underlying switch fabric to stitch together each of the VNFs so as to create service chain 28A using the selected service nodes 10. Orchestration engine 20 further issues instructions causing SDN controller 19 to update forwarding information in the service provider network core 7 to tie the input and egress of service chain 28A to the routing and switching infrastructure of service provider network core 7 for servicing network traffic of the subscriber device 16.

In another example implementation, orchestration engine 20 pre-creates a plurality of pools, each of the pools associated with a different type of service chains. That is, each of the different pools contains a plurality of service chains formed from a respective set of service nodes that are pre-configured with executable images for implementing a particular combination of VNFs. For example, a first pool may contain a plurality of service chains, each of the service chains comprising a set of service nodes 10 that are pre-configured with executable images and booted to an operational state for implementing a first sequence of VNFs, such as HTTP filtering followed by IDP followed by NAT. A second pool may contain a different set of service chains, each of the service chains comprising a set of service nodes 10 that are pre-configured with executable images and booted to an operational state for implementing a second sequence of VNFs, such as a firewall VNF followed by IDP. Additional pools may be maintained in this manner to each contain a plurality of pre-configured service chains. Upon receiving a request for network services from a subscriber device 16, orchestration engine 20 determines the necessary service chain to satisfy the request and selects the appropriate service chain, such as service chain 28A from the respective pools of service chains 28A-28N. Orchestration engine 20 further issues instructions causing SDN controller 19 to update forwarding information of the underlying switch fabric according to an ingress and egress of the selected service chain for servicing the traffic of the subscriber device 16.

In this way, the techniques of the disclosure may allow orchestration engine 20 to reduce the amount of time required to service a request from subscriber device 16 by utilizing pre-allocated VNFs and/or service chains of VNFs to service the request. In other words, the techniques of the disclosure may allow service provider network 2 to establish pools of pre-imaged service nodes 10 that are booted to an initial operational state such that the service provider 2 may quickly and efficiently deploy, on demand, the VNFs executed by the service nodes 10 to satisfy requests for network services from subscriber devices 16. Thus, a service provider network 2 as described herein may greatly decrease the time required by service provider network 2 to respond to service requests by shifting a majority of the time required to respond to the requests to pre-processing that occurs in advance of a service request from a subscriber device 16.

The architecture of system 2 illustrated in FIG. 1 is shown as an example. The techniques as set forth in this disclosure may be implemented in the example system 2 of FIG. 1, as well as other types of systems not described specifically herein. Nothing in this disclosure should be construed so as to limit the techniques of this disclosure to the example architecture illustrated by FIG. 1.

Figure 2:
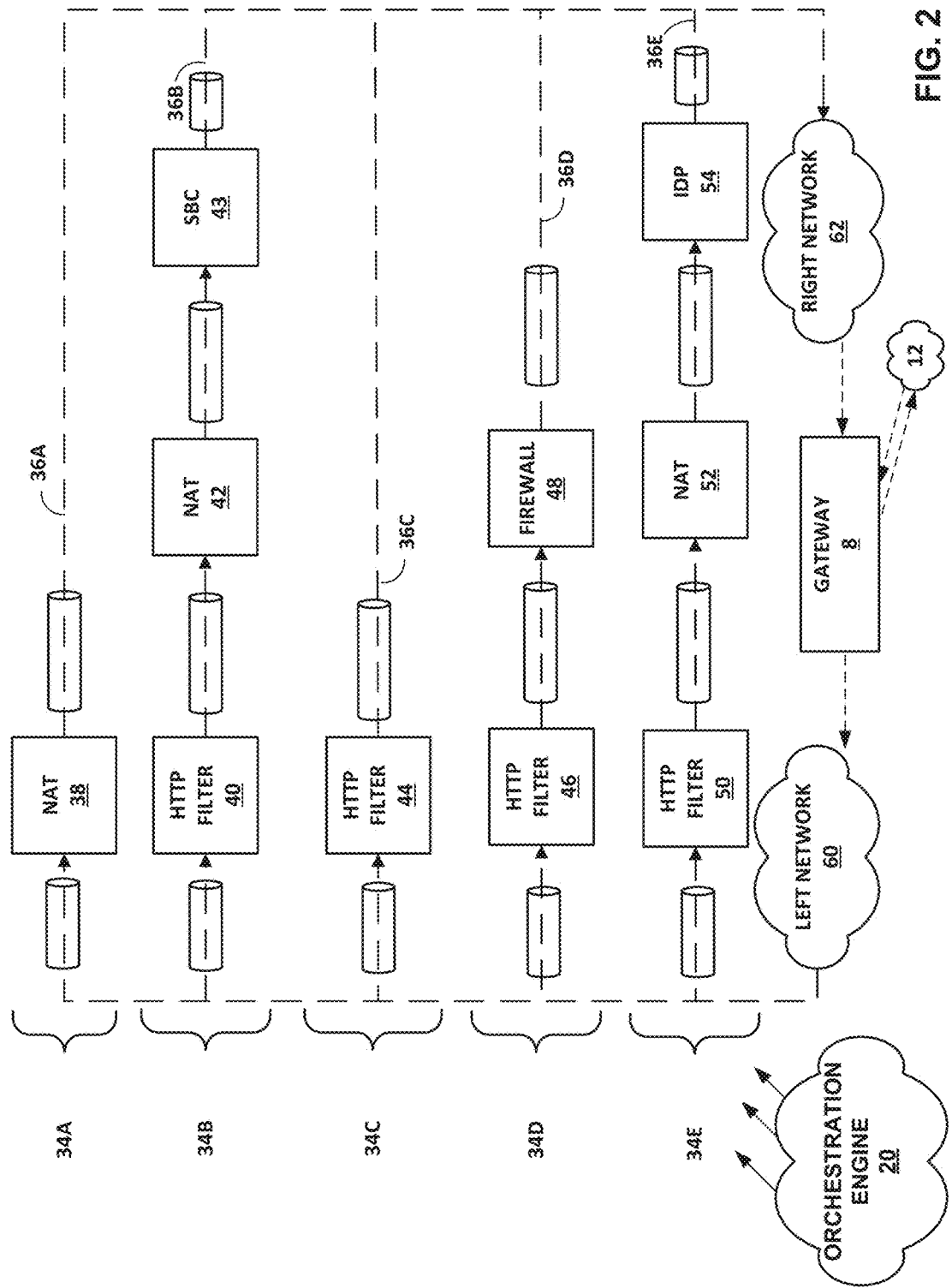
FIG. 2 is a block diagram illustrating an example in which an orchestration engine has dynamically created a set of service chains on demand using pools of pre-configured VNFs or instantiated yet unconnected service chains, in accordance with the techniques of the disclosure.

FIG. 2 is a block diagram illustrating an example in which orchestration engine 20 has dynamically created a set of service chains 34A-34E on demand using pools of pre-configured VNFs or instantiated yet unconnected service chains, in accordance with the techniques of the disclosure. In particular, FIG. 2 illustrates an example in which orchestration engine 20 of FIG. 1 has fully deployed a set of service chains 34A-34E configured to connect to gateway 8 via left network 60 and right network 62. Orchestration engine 20 and Gateway 8 may, in one example, represent orchestration engine 20 and gateway 8 of FIG. 1 respectively such that service chains 34 represent an example set of service chains 28 provided by service nodes 10. In the example of FIG. 2, each service chain 34 comprises one or more service nodes executing a particular VNF such that the service chain provides a composite network service.

As referred to herein, left network 60 generally refers to the forwarding and switching infrastructure of service provider core 7 of FIG. 1 that supplies in-bound traffic to service chains 34. Further, right network 62 generally refers to the forwarding and switching infrastructure of service provider core 7 of FIG. 1 that receives outbound traffic from service chains 34. In other words, left network 60 and right network 62 represent switching fabric paths to which orchestration engine 20, via instructions to SDN controller 19, stitches selected service chains so as to fully install the service chains to direct network traffic flow from subscriber devices 16 and gateway 8, through the switching fabric designated as the left network 60 to service chains 34, and from service chains 34 through switching fabric designated as the right network 62 to public network 12.

In accordance with the techniques described herein, orchestration engine 20, via SDN controller 19, installs the pre-configured service chains on demand (or selects and stitches together pre-configured VNFs) and updates underlying forwarding information associated with left and right networks 60, 62 so as to direct subscriber packet flows through the service chains. In this example, orchestration engine 20 issues instructions to SDN controller 19 causing SDN controller 19 to direct one or more subscriber packet flows 36A along a first service chain 34A to receive network address translation (NAT) service 38. Similarly, orchestration engine 20 issues instructions to SDN controller 19 causing SDN controller 19 to direct one or more subscriber packet 36B along a second service chain 34B for application of an HTTP filter service 40, NAT service 42 and SBC services 43 for voice over IP (VoIP) processing and control. In service chain 34C, orchestration engine 20 issues instructions to SDN controller 19 causing SDN controller 19 to direct packet flows 36C only to HTTP filter service 44. In service chain 34D, SDN controller 19 directs packet flows 36D to HTTP filter 46 and subsequently to firewall service 48. As another example, orchestration engine 20 issues instructions to SDN controller 19 causing SDN controller 19 to direct packet flows 36E along service chain 34E for application of HTTP filter 50, NAT 52 and intrusion detection and prevention (e.g., deep packet inspection) service 54.

In this way, orchestration engine 20 or other device, such as gateway 8, is able to construct on demand a variety of different network services using preconfigured VNFs and/or service chains even though the network services may require different combinations and orderings of VNFs. The architecture of gateway 8 and service chains 34 illustrated in FIG. 2 is shown as an example. The techniques as set forth in this disclosure may be implemented in the example of FIG. 2, as well as other types of systems not described specifically herein. For example, a service chain may comprise the network services depicted in FIG. 2, or various other network services not expressly discussed herein. Nothing in this disclosure should be construed so as to limit the techniques of this disclosure to the example architecture illustrated by FIG. 2.

Figure 3:
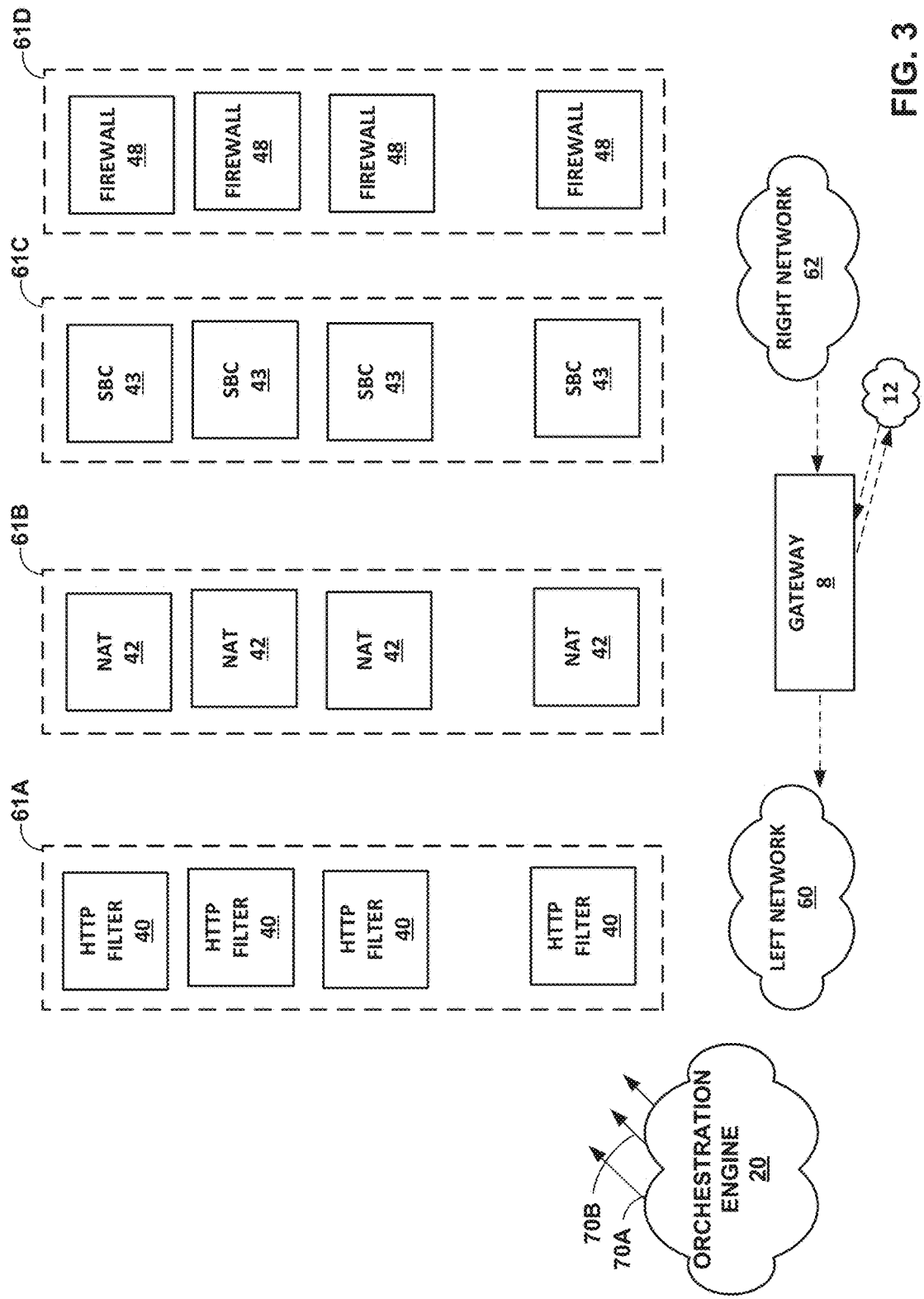
FIG. 3 is a block diagram illustrating an example network in which an orchestration engine maintains and utilizes pools of service nodes pre-configured as different types of VNFs so as to dynamically construct a service chain for providing a network service on demand in accordance with the techniques of the disclosure.

FIG. 3 is a block diagram illustrating an example network in which orchestration engine 20 maintains and utilizes pools of service nodes pre-configured as different types of VNFs so as to dynamically construct a service chain for providing a network service on demand in accordance with the techniques of the disclosure. Specifically, FIG. 3 illustrates an example implementation in which orchestration engine 20 has maintains and utilizes a plurality of pools 61A-61D (collectively, "pools 61") of service nodes, where the service nodes of each pool has been loaded with an executable software image and optionally booted so as to execute a respective VNF. Such pre-configuring may, for example, occur prior to even receiving a request to service traffic from subscriber devices 16.

For example, prior to deploying network services by stitching together service chains of service nodes and attaching the service nodes to the left network 60 or right network 62, orchestration engine 20 pre-configures each of the service nodes by, for each service node, spawning a VM that executes an instance of a VNF assigned to the respective pool (e.g., HTTP, DPI, firewall, etc.), booting the VM, and applying basic configuration to the VM instance such that the VM is executing a particular instance of a VNF. In the example of FIG. 1, pool 61A comprises a plurality of service nodes pre-configured to operate as HTTP filters 40, pool 61B comprises a plurality of service nodes pre-configured to operate as NAT services 42, pool 61C comprises a plurality of service nodes pre-configured to operate as SBC services 43, and pool 61D comprises a plurality of service nodes pre-configured to operate as firewall services 48. In this way, each of pools 61 corresponds to a different VNF that may potentially be subsequently needed to provide network services. However, unlike a second example further described below, none of the VNFs have been stitched to form a partial service chain.

Upon receiving a request for network services from subscriber device 16, orchestration engine 20 determines the necessary VNFs and an ordering required to create a composite network service capable of servicing the request. Based on the determination, orchestration engine 20 selects service nodes from each corresponding pool 61 of service nodes, and instructs SDN controller 19 to update forwarding information of the service nodes and/or switch fabric to dynamically create a service chain using the selected service nodes executing the required VNFs. As one example, orchestration engine 20 forms the service chain by issuing instructions to SDN controller 19 causing SDN controller 19 to update the routing and switching infrastructure of service provider core 7 such that the egress traffic of each service node is forwarded to the ingress of the subsequent service node in the chain. In one example, orchestration engine 20 selects a service node executing a NAT service 42 from pool 61B to create the service chain 34A of FIG. 2. In another example, orchestration engine 20 selects a service node executing an HTTP filter 50 from pool 61A, a service node executing a NAT service 42 from pool 61B, and a service node executing an SBC service 43 from pool 61C to create the service chain 34B of FIG. 2. In some examples, orchestration engine 20 further applies service-specific configuration to each of the service nodes to configure the service nodes for servicing traffic from subscriber device 16. After creating the appropriate service chain to handle the subscriber traffic, the orchestration engine 20 issues instructions to SDN controller 19 causing SDN controller 19 to update the routing and switching infrastructure of service provider core 7 such that the left network 60 provides inbound traffic to the ingress of the service chain and right network 61 receives outbound traffic from the service chain so as to allow the service chain to provide a composite network service for handling the network traffic of the subscriber device 16.

In some examples, after the service chain is no longer required (i.e., after network traffic from subscriber device 16 ceases), orchestration engine 20 dissolves the service chain and returns its component service nodes back to the pool 61 of service nodes. For example, orchestration engine 20 issues instructions to SDN controller 19 causing SDN controller 19 to update the routing and switching infrastructure of service provider core 7 such that the left network 60 no longer provides inbound traffic to the ingress of the service chain and right network 61 no longer receives outbound traffic from the service chain. In some examples orchestration engine 20 disables usage metering of the service chain and deactivates a license requirement for the service chain. Orchestration engine 20 dissolves the service chain by issuing instructions to SDN controller 19 to update the routing and switching infrastructure of service provider core 7 such that the egress traffic of each service node is no longer forwarded to the ingress of the subsequent service node in the chain. Orchestration engine 20 removes service-specific configurations applied to the service nodes and returns the service nodes to the appropriate pool 61. Further, in some examples, orchestration engine 20 returns each of the service nodes to a power-conservation mode upon returning the service nodes to the pool.

In some examples, while service nodes are idling within the corresponding pool of plurality of pools 61 of service nodes, orchestration engine 20 configures the service nodes to operate in a power-conservation mode. While in the power conservation mode, each of the idle service nodes conserve resources by entering into a state of operation that with low power requirements. For example, the idle service nodes may enter a "sleep" or "hibernation" mode, may throttle down the performance of the processor, or may deactivate certain features or modules of the service node so that the service nodes conserve energy. In some examples, prior to orchestration engine 20 issuing instructions to SDN controller 19 to update the routing and switching infrastructure of service provider core 7 such that a service chain is enabled to provide the selected network service to subscriber device 16, orchestration engine 20 transmits a message 70A to each of the service nodes of the service chain, causing each of the service nodes to leave the power-conservation mode and enter into an operational or full-power mode. Similarly, upon returning each of the service nodes to the corresponding pool of the plurality of pools 61 of service nodes, orchestration engine 20 transmits a message 70B to each of the service nodes, causing each of the service nodes to leave the full-power mode and enter into the power-conservation mode.

In some examples, the service provider network 2 charges each subscriber device 16 according to the use time of each VNF forming a composite network service accessed by the subscriber device 16. In yet a further example, a vendor provides each VNF to the service provider network 2. In this example, orchestration engine 20 of service provider network 2 records the use time of each VNF comprising the composite network service accessed by the subscriber device 16 such that service provider network 2 may provide metered usage statements to each vendor for facilitating the billing of subscriber devices 16 for the usage time of each VNF accessed by subscriber device 16. In these examples, orchestration engine 20 activates metering of the usage of VNFs by subscriber device 16 prior to updating the routing and switching infrastructure of service provider core 7 such that the service chain is enabled to provide the composite network service to subscriber device 16. In further examples, orchestration engine 20 activates metering of the usage of each VNF accessed by subscriber device 16 only while the corresponding VNF processes network traffic from subscriber device 16. Furthermore, upon dissolving the service chain and returning the service nodes to the corresponding pools of the plurality of pools 61 of service nodes, orchestration engine 20 deactivates metering of the usage of each VNF of each of the service nodes returned to the corresponding pools of the plurality of pools 61 of service nodes.

In some examples, prior to orchestration engine 20 removing service nodes from the corresponding pools of the plurality of pools 61 of service nodes to form a service chain to service network traffic of subscriber device 16, orchestration engine 20 obtains licensing for each VNF forming the composite network service accessed by the subscriber device 16. For example, orchestration engine 20 transmits a message to a license manager to access a licensing key for each VNF selected to form the composite network service provided to the subscriber device 16. Furthermore, upon dissolving the service chain and returning the service nodes to the corresponding pools of the plurality of pools 61 of service nodes, orchestration engine 20 transmits a message to the license manager to return the licensing key associated with each of the VNFs of each of the service nodes returned to the corresponding pools of the plurality of pools 61 of service nodes.

Use of "pools" of pre-configured VNFs according to the disclosure may allow orchestration engine 20 to reduce the amount of time required to service a request from a subscriber device 16 by pre-allocating & configuring resources necessary to service the request. In other words, the techniques of the disclosure may allow service provider network 2 to establish pools 61 of service nodes executing VNFs that the service provider network 2 may draw from to create composite network services that handle network traffic from subscriber devices. Thus, service provider network 2, as described herein, may greatly decrease the time required by the service provider network 2 to respond to service requests by shifting a majority of the time required to respond to the requests to pre-processing that occurs in advance of a service request from a subscriber device 16.

The architecture of the network illustrated in FIG. 3 is shown as an example. The techniques as set forth in this disclosure may be implemented in the example network of FIG. 3, as well as other types of networks not described specifically herein. For example, a pool 60 may comprise service nodes executing one or more of the VNFs depicted in FIG. 3, or various other VNFs not expressly discussed herein. Further, a pool 60 may comprise service nodes executing heterogeneous or homogenous instances of VNFs. Further, a pool 60 may comprise a static or dynamical number of service nodes. Nothing in this disclosure should be construed so as to limit the techniques of this disclosure to the example architecture illustrated by FIG. 3.

Figure 4:
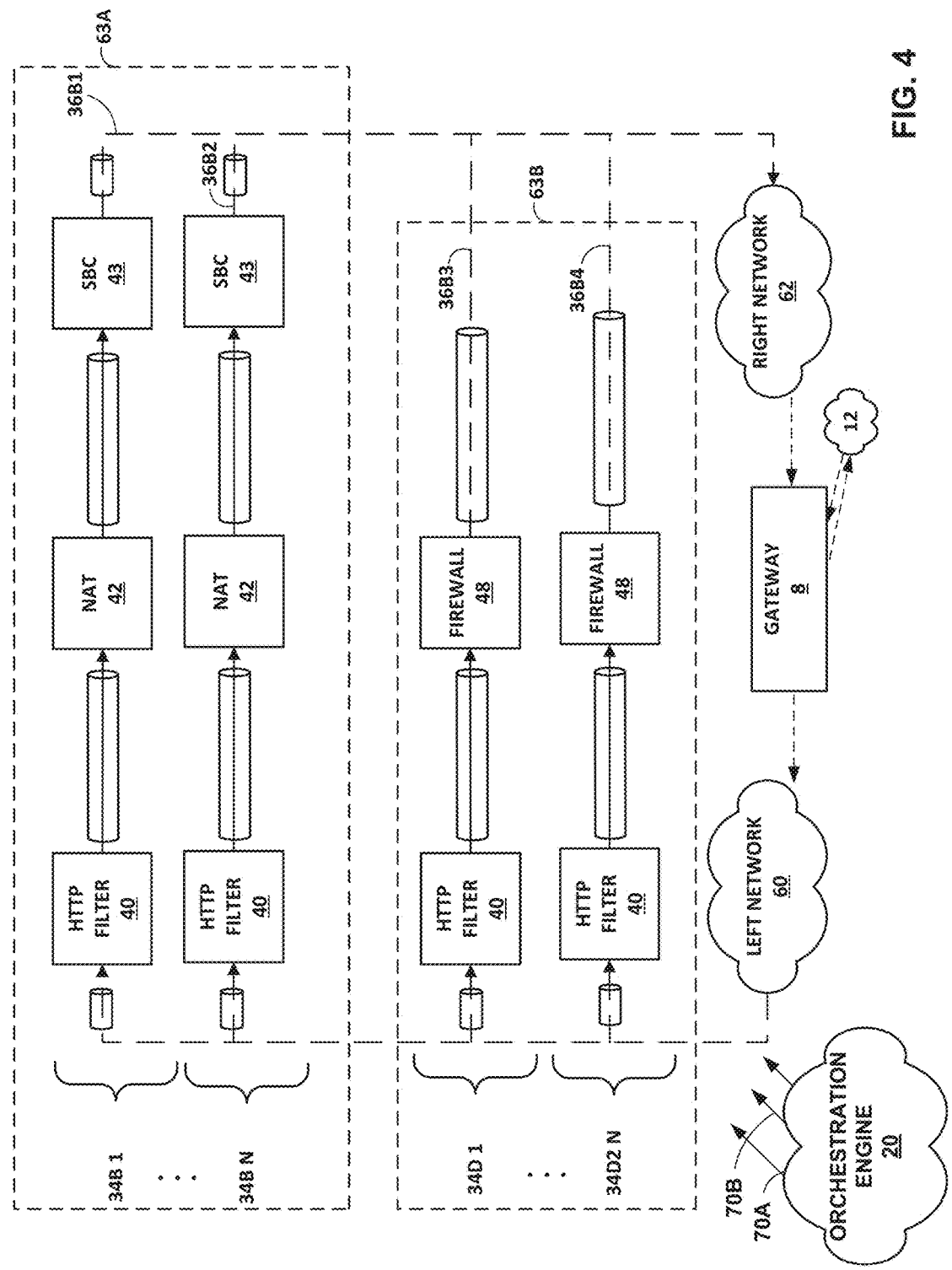
FIG. 4 is a block diagram illustrating an example network in which an orchestration engine maintains and utilizes pools of different types of pre-configured service chains to dynamically deploy network services on demand in accordance with the techniques of the disclosure.

FIG. 4 is a block diagram illustrating an example network in which orchestration engine 20 maintains and utilizes pools of different types of pre-configured yet unterminated service chains to dynamically deploy network services on demand in accordance with a second example implementation of the techniques of the disclosure. Specifically, FIG. 4 illustrates pools 63A-63B (collectively, "pools 63") of pre-configured yet unterminated service chains 34 that orchestration engine 20 has pre-initialized prior to receiving a request to service traffic from subscriber devices 16. As explained in further detail below, each of service chains 34 within pools 63A, 63B comprise a sequenced order of pre-configured VNFs (e.g., spawned VMs loaded with particular software images, booted and configured so as to be executing a VNF), where the underlying forwarding information has already been partially updated to stitch the VNFs together to form the service chains. However, the underlying forwarding information of the switch fabric has not been fully implemented such that the ingress interfaces and egress interfaces of the service chains are not yet connected to left and right network 60, 62 such that the service chains may be viewed as "unterminated" service chains that are otherwise ready for deployment.

In one example, prior to receiving a request to service traffic from subscriber device 16, and prior to updating the routing and switching fabric of service provider core 7 such that service chains 34 receive or forward network traffic information, for each service node of a plurality of service nodes, orchestration engine 20 generates pools 63 by spawning VMs executing respective instances of a commonly-used VNFs and applying basic configuration to the instances. Further, orchestration engine 20 issues instructions to SDN controller 19 causing SDN controller 19 to chain together various combinations and orderings of service nodes executing different VNFs to create different pools of commonly-used service chains. For example, orchestration engine 20 may form each chain by issuing instructions to SDN controller 19 causing SDN controller 19 to update the routing and switching infrastructure of service provider core 7 such that the egress traffic of each service node in the service chain is forwarded to the ingress of the subsequent service node in the service chain. In this example, each pool comprises a number of service chains of a particular type, i.e., a particular combination and ordering of VNFs. For instance, pool 63A comprises a plurality of service chains 34B 1-N, where N represents any number of service chains 34B of FIG. 2. Each of service chains 34B include a service node executing an instance of an HTTP filter 40, a service node executing an instance of a NAT service 42, and a service node executing an instance of an SBC service 43. Further, pool 63B comprises a plurality of service chains 34D 1-N, where N represents any number of service chains 34D of FIG. 2. Each of service chains 34D include a service node executing an instance of an HTTP filter 40 and a service node executing an instance of a firewall service 48.

Upon receiving a request for network services from subscriber device 16, orchestration engine 20 determines the appropriate pool 63 having the type of service chain needed satisfy the request and selects an unused (i.e., unterminated) service chain 34 from the corresponding pool 63 of service chains. In some examples, orchestration engine 20 further applies service-specific configuration to each of the service nodes of service chain 34 to configure the service nodes for servicing traffic from subscriber device 16. Orchestration engine 20 issues instructions to SDN controller 19 causing SDN controller 19 to update forwarding information within the devices of the switch fabric and/or virtual machines of the ingress and egress service nodes so as to attach ingress of the selected service chain to the left network 60 and the egress of the selected service chain to right network 61 of gateway 8 to allow servicing of the network traffic of the subscriber device 16. In other words, orchestration engine 20 issues instructions to SDN controller 19 causing SDN controller 19 to update the routing and switching infrastructure of service provider core 7 such that the left network 60 provides inbound traffic to the ingress of the selected service chain and right network 61 receives outbound traffic from the selected service chain so as to allow the selected service chain to provide a composite network service for handling the network traffic of the subscriber device 16.

In another example, orchestration engine 20 determines that a service chain of the type 34B is required, and so selects an unterminated service chain 34B from pool 63A and issues instructions to SDN controller 19 to attach the service chain to the left network 60 and right network 61 such that service chain 34B provides a composite network service for handling the network traffic of the subscriber device 16. In another example, orchestration engine 20 determines that a service chain of the type 34D is required, and so selects an unterminated service chain 34D from pool 63B and issues instructions to SDN controller 19 to attach the service chain to the left network 60 and right network 61 such that service chain 34D provides a composite network service for handling the network traffic of the subscriber device 16.

In some examples, after the service chain is no longer required (i.e., after network traffic from subscriber device 16 ceases), orchestration engine 20 returns the service chain to the appropriate pool of service chains 63. For example, orchestration engine 20 issues instructions to SDN controller 19 causing SDN controller 19 to update the routing and switching infrastructure of service provider core 7 such that the left network 60 no longer provides inbound traffic to the ingress of the service chain and right network 61 no longer receives outbound traffic from the service chain. Further, orchestration engine 20 removes any service-specific configurations applied to the service nodes of the service chain before returning the service chain to the appropriate pool of service chains 63 as an unterminated service chain awaiting future use.

In some examples, while service chains 34 are idling within the corresponding pool of the plurality of pools 63 of service chains, orchestration engine 20 configures each of the service nodes of the service chain to operate in a power-conservation mode. While in the power conservation mode, each of the idle service nodes conserve resources by entering into a state of operation that with low power requirements. For example, the idle service nodes may enter a "sleep" or "hibernation" mode, may throttle down the performance of the processor, or may deactivate certain features or modules of the service node so that the service nodes conserve energy. In some examples, prior to orchestration engine 20 instructing SDN controller 19 to update the routing and switching infrastructure of service provider core 7 such that a service chain 34 is enabled to provide the selected network service to subscriber device 16, orchestration engine 20 transmits a message 70A to each of the service nodes of the service chain 34, causing each of the service nodes to leave the power-conservation mode and enter into an operational or full-power mode. Similarly, upon returning the service chain to the corresponding pool of the plurality of pools 63 of service chains, orchestration engine 20 transmits a message 70B to each of the service nodes of service chain 34, causing each of the service nodes to leave the full-power mode and enter into the power-conservation mode.

In some examples, the service provider network 2 charges each subscriber device 16 according to the use time of each VNF forming a composite network service accessed by the subscriber device 16. In yet a further example, a vendor provides each VNF to the service provider network 2. In this example, orchestration engine 20 of service provider network 2 records the use time of each VNF comprising the composite network service accessed by the subscriber device 16 such that service provider network 2 may provide metered usage statements to each vendor for facilitating the billing of subscriber devices 16 for the usage time of each VNF accessed by subscriber device 16. In these examples, orchestration engine 20 activates metering of the usage of VNFs by subscriber device 16 prior to updating the routing and switching infrastructure of service provider core 7 such that the service chain is enabled to provide the composite network service to subscriber device 16. In further examples, orchestration engine 20 activates metering of the usage of each VNF accessed by subscriber device 16 only while the corresponding VNF processes network traffic from subscriber device 16. Furthermore, upon returning the service chain to the corresponding pool of the plurality of pools 63 of service chains, orchestration engine 20 deactivates metering of the usage of each VNF of each of the service nodes forming the service chain returned to the corresponding pool of the plurality of pools 63 of service chains.

In some examples, prior to orchestration engine 20 selecting a service chain from the corresponding pool of the plurality of pools 63 of service chains to service network traffic of subscriber device 16, orchestration engine 20 obtains licensing for each VNF forming the composite network service accessed by the subscriber device 16. For example, orchestration engine 20 transmits a message to a license manager to access a licensing key for each VNF forming the composite network service provided to the subscriber device 16 via the selected service chain. Furthermore, upon returning the service chain to the corresponding pool of the plurality of pools 63 of service chains, orchestration engine 20 transmits a message to the license manager to return the licensing key associated with each of the VNFs of each of the service nodes forming the service chain returned to the corresponding pool of the plurality of pools 63 of service chains.

Accordingly, use of pools of different types of pre-configured, unterminated service chains according to the disclosure may allow the orchestration engine 20 to reduce the amount of time required to service a request from a subscriber device 16 by pre-allocating resources to service the request. In other words, the techniques of the disclosure may allow service provider network 2 to establish pools 61 of service chains that the service provider network 2 may draw from to satisfy requests for services. Thus, service provider network 2, as described herein, may greatly decrease the time required by the service provider network 2 to respond to service requests by shifting a majority of the time required to respond to the requests to pre-processing that occurs in advance of a service request from a subscriber device 16.

The architecture of the network illustrated in FIG. 4 is shown as an example. The techniques as set forth in this disclosure may be implemented in the example network of FIG. 4, as well as other types of networks not described specifically herein. For example, a pool 63 may comprise service chains having the combination of service nodes executing VNFs depicted in FIG. 4, or various other combinations of service nodes executing VNFs not expressly discussed herein. Further, a pool 63 may comprise heterogeneous or homogenous instances of service chains. Further, a pool 63 may comprise a static or dynamical number of service chains. Nothing in this disclosure should be construed so as to limit the techniques of this disclosure to the example architecture illustrated by FIG. 4.

Figure 5:
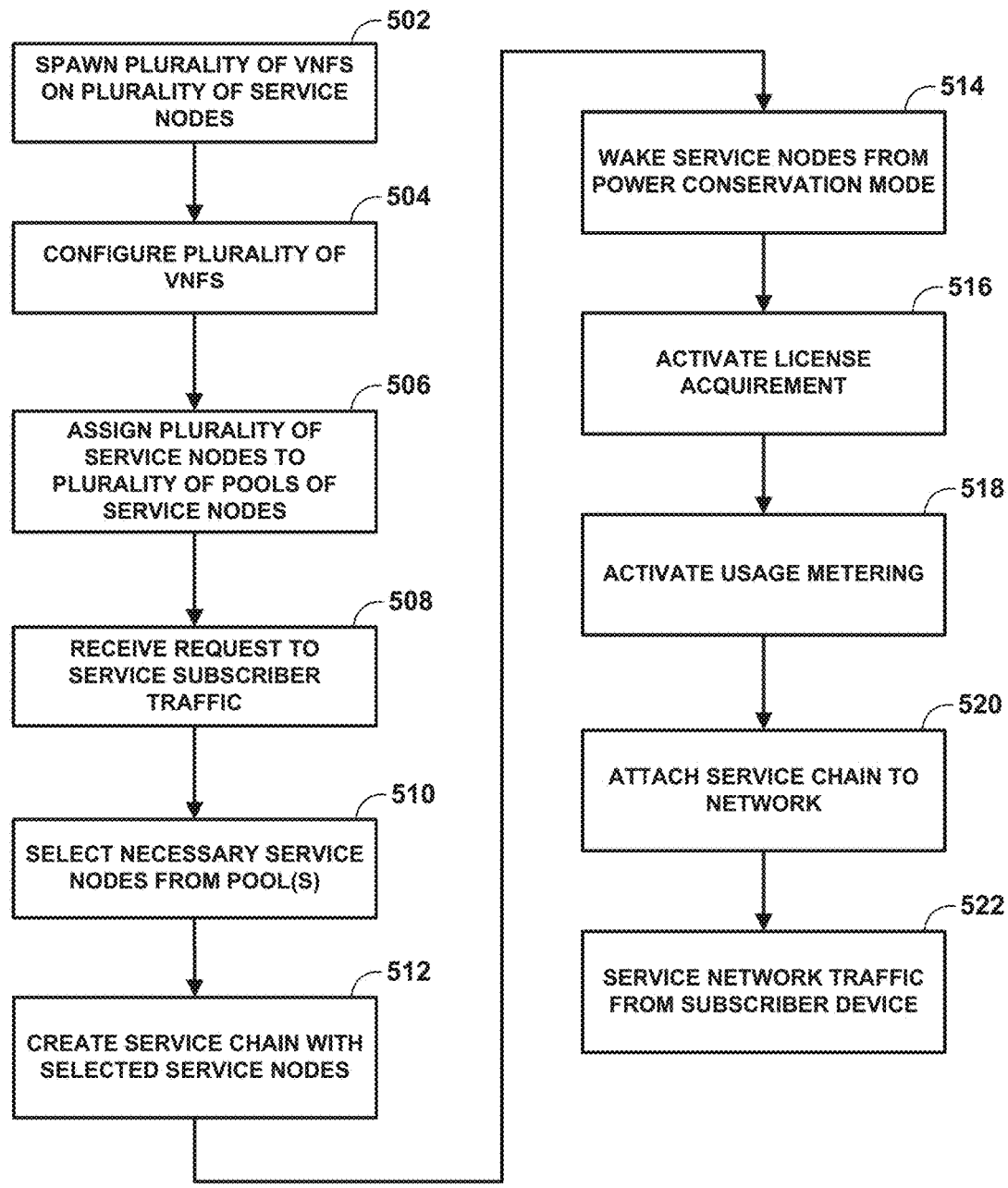
FIG. 5 is a flowchart illustrating an example operation for providing network services to a subscriber device on demand by using pools of service nodes executing different types of VNFs according to the techniques of the disclosure.

FIG. 5 is a flowchart illustrating an example operation for providing network services to a subscriber device on demand by using pools of service nodes executing different types of VNFs according to the techniques of the disclosure. For convenience, the operation of FIG. 5 is described with respect to FIGS. 1 and 3. In the example of FIG. 5, service provider network 7 maintains and utilizes pools of service nodes that have been pre-configured with specific VNFs and that can be selectively deployed on demand so as to reduce the time required to instantiate network services to service requests by subscriber device 16.

In one example implementation, orchestration engine 20 initially spawns a plurality of VMs, each executing a VNFs, so as to provide a plurality of service nodes. (502). Further, orchestration engine 20 applies any basic application-independent (e.g., customer-independent) configuration to each of the VNFs (504). In addition, orchestration engine 20 groups the VNFs by assigning each of the plurality of service nodes to one of a plurality of pools of service nodes, each pool associated with a different type of VNF and containing the set of service nodes that are pre-configured with an executable image for implementing that corresponding VNF of the respective pool (506). For example, orchestration engine 20 may group the VNFs such that a first pool contains a set of service nodes 10 that are each pre-configured with an executable image and booted to an initial operational state for implementing a first VNF, such as HTTP filtering. A second pool may contain a different set of service nodes 10 that are each pre-configured with an executable image and booted to an initial operational state for implementing a second VNF, such as IDP. Additional pools may be maintained in this manner.

After creating the pool of service nodes, the orchestration engine 20 may subsequently receive a request for a network service from subscriber device 16 (508). Upon receiving the request, orchestration engine 20 determines the particular combination and sequence of VNFs required to satisfy the request and selects a set of currently unassigned service nodes 10 from the pools to perform the VNFs for the requested service (510). Further, the orchestration engine 20 issues instructions to SDN controller 19 causing SDN controller 19 to dynamically update the forwarding state of the underlying switch fabric to stitch together each of the service nodes in the required order so as to create a service chain (e.g., service chain 28A) for providing the required network service using the selected service nodes 10 (512).

In some examples, orchestration engine 20 wakes each of the service nodes comprising service chain 28A from a power conservation mode to an operational mode (514). In a further example, upon creating the service chain, orchestration engine 20 activates license acquirement for each of the VNFs executing on the service nodes (516). In a further example, orchestration engine 20 of service provider core 7 activates usage metering such that service provider core 7 meters the usage of the composite network service provided by service chain 28A (518). Thus, service provider core 7 may begin metering subscriber device 16 for the use of the composite network service immediately prior to deploying service chain 28A for servicing of network traffic of the subscriber device 16. Orchestration engine 20 further issues instructions to SDN controller 19 causing SDN controller 19 to update forwarding information in the service provider network core 7 to tie the input and egress of service chain 28A to the left network 60 and right network 62 (e.g., the routing and switching infrastructure) of service provider network core 7 (520) such that the service chain may service network traffic of the subscriber device 16 (522).

In this way, the techniques of the disclosure may allow orchestration engine 20 to reduce the amount of time required to service a request from subscriber device 16 by utilizing pre-allocated VNFs and/or service chains of VNFs to service the request. In other words, the techniques of the disclosure may allow service provider network 2 to establish pools of pre-imaged service nodes 10 that are booted to an initial operational state such that the service provider 2 may quickly and efficiently deploy, on demand, the VNFs executed by the service nodes 10 to satisfy requests for network services from subscriber devices 16. Thus, a service provider network 2 as described herein may greatly decrease the time required by service provider network 2 to respond to service requests by shifting a majority of the time required to respond to the requests to pre-processing that occurs in advance of a service request from a subscriber device 16.

The operation illustrated in FIG. 5 is shown as an example. The techniques as set forth in this disclosure may be implemented in the example operation of FIG. 5, as well as other types of operations not described specifically herein. Nothing in this disclosure should be construed so as to limit the techniques of this disclosure to the example operation illustrated by FIG. 5.

Figure 6:
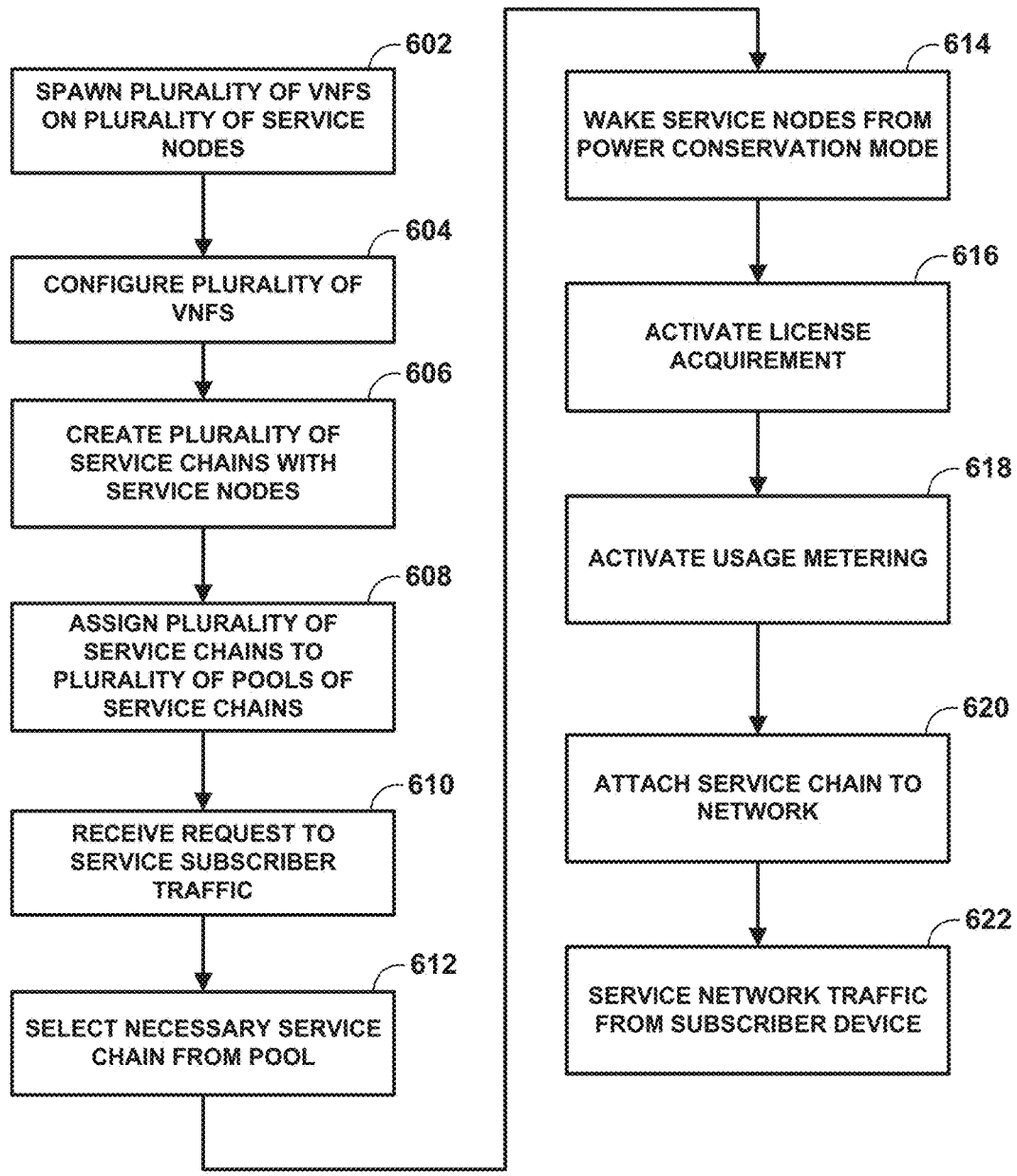
FIG. 6 is a flowchart illustrating an example operation for providing network services to a subscriber device on demand by using pools of different types of pre-configured service chains according to the techniques of the disclosure.

FIG. 6 is an example operation for providing network services to a subscriber device on demand by using pools of different types of pre-configured, unterminated service chains according to the techniques of the disclosure. For convenience, the operation of FIG. 5 is described with respect to FIGS. 1 and 4. In the example of FIG. 6, service provider network 7 maintains and utilizes pools of service chains that have been pre-configured to perform commonly-used network services that can be selectively deployed on demand so as to reduce the time required to instantiate network services to service requests by subscriber device 16.

In one example implementation, orchestration engine 20 spawns a plurality of VMs, each configured to execute a VNF, so as to provide a plurality of service nodes. (602). Further, orchestration engine 20 applies any basic application-independent (e.g., customer-independent) configuration to each of the VNFs (604). Further, the orchestration engine 20 issues instructions to SDN controller 19 causing SDN controller 19 to dynamically update the forwarding state of the underlying switch fabric to stitch together the service nodes in various order and combinations so as to create a plurality of service chains 34 providing, for example, various commonly-used network services using the service nodes (606). Orchestration engine 20 groups the service chains by assigning each of the plurality of service chains 34 to one of a plurality of pools of service chains 63, each of the pools associated with a different type of service chains 34, where each type of service chain represents a different order or combination of VNFs (608). That is, each of the different pools 63 contains a plurality of service chains 34 formed from a respective set of service nodes that are pre-configured with executable images for implementing a particular combination and sequence of VNFs. For example, a first pool 63A may contain a plurality of service chains 34B, each of the service chains 34B comprising a set of service nodes 10 that are pre-configured with executable images and booted to an initial operational state for implementing a first sequence of VNFs, such as HTTP filtering followed by NAT followed by SBC. A second pool 63B may contain a different set of service chains 34D, each of the service chains 34D comprising a set of service nodes 10 that are pre-configured with executable images and booted to an initial operational state for implementing a second sequence of VNFs, such as a HTTP filtering followed by a firewall service. Additional pools may be maintained in this manner to each contain a plurality of pre-configured service chains.

At some point after creating the pools of unterminated service chains, orchestration engine 20 subsequently receives a request for network services from subscriber device 16 (610). Such request may, for example, take the form of a network communication or even a manual request made by and administrator. Upon receiving the request, orchestration engine 20 determines the necessary service chain having the correct combination and order of VNFs to satisfy the request and selects the appropriate service chain, such as service chain 34B1, from the respective pool 63B of the plurality of pools of service chains 63 (612).

In some examples, orchestration engine 20 wakes each of the service nodes comprising service chain 34B1 from a power conservation mode to an operational mode (614). In a further example, upon creating the service chain, orchestration engine 20 activates license acquirement for each of the VNFs executing on the service nodes (616). In a further example, orchestration engine 20 activates usage metering such that service provider core 7 meters the usage of the composite network service provided by service chain 28A (618). Thus, service provider core 7 may begin metering subscriber device 16 for the use of the composite network service immediately prior to deploying service chain 28A for servicing of network traffic of the subscriber device 16. Orchestration engine 20 issues instructions to SDN controller 19 causing SDN controller 19 to update forwarding information of the underlying switch fabric according to an ingress and egress of the selected service chain (620) such that the service chain may provide a network service for handling the traffic of the subscriber device 16 (622).

In this way, the techniques of the disclosure may allow orchestration engine 20 to reduce the amount of time required to service a request from subscriber device 16 by utilizing service nodes of pre-allocated VNFs and/or service chains of VNFs to service the request. In other words, the techniques of the disclosure may allow service provider network 2 to establish pools of pre-imaged service nodes 10 that are booted to an initial operational state such that the service provider 2 may quickly and efficiently deploy, on demand, the VNFs executed by the service nodes 10 to satisfy requests for network services from subscriber devices 16. Thus, a service provider network 2 as described herein may greatly decrease the time required by service provider network 2 to respond to service requests by shifting a majority of the time required to respond to the requests to pre-processing that occurs in advance of a service request from a subscriber device 16.

The operation illustrated in FIG. 6 is shown as an example. The techniques as set forth in this disclosure may be implemented in the example operation of FIG. 6, as well as other types of operations not described specifically herein. Nothing in this disclosure should be construed so as to limit the techniques of this disclosure to the example operation illustrated by FIG. 6.

Figure 7:
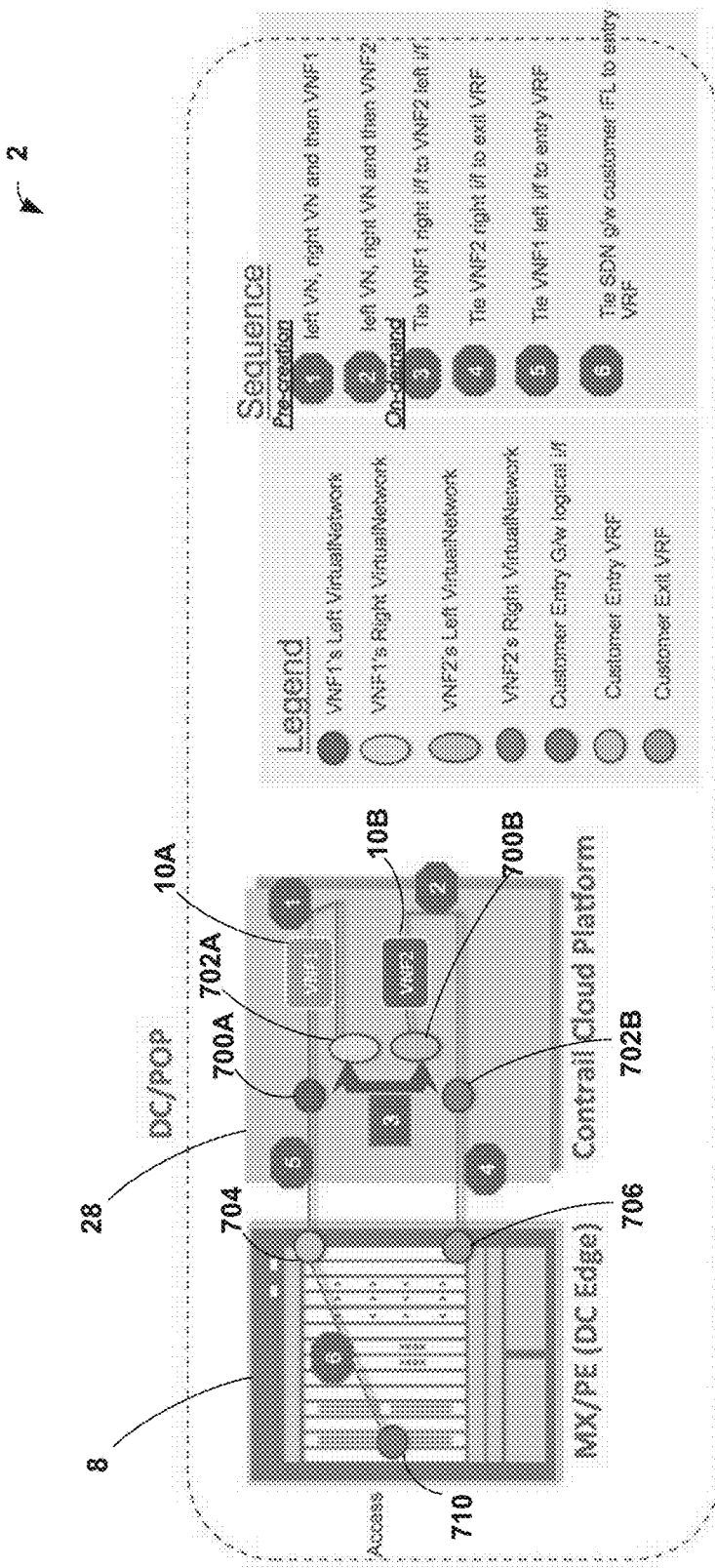
FIG. 7 is a block diagram illustrating an example network in which an orchestration engine maintains and utilizes pools of service nodes pre-configured as different types of VNFs so as to dynamically construct a service chain for providing a network service on demand in accordance with the techniques of the disclosure.
Figure 7:
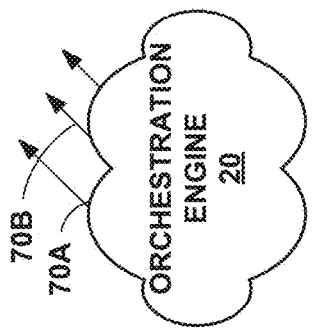

FIG. 7 is a block diagram illustrating an example network 2 in which an orchestration engine 19 maintains and utilizes pools of service nodes 10 pre-configured as different types of VNFs so as to dynamically construct a service chain 28 for providing a network service on demand in accordance with the techniques of the disclosure. Specifically, in the example of FIG. 7, each service node 10 includes a pre-configured left network 700 and right network 702 that SDN controller 19, in response to instructions from orchestration engine 20, may rapidly attach to service provider network core 7 for servicing of network traffic of the subscriber device 16.

In the example of FIG. 7, prior to deploying network services by stitching together service chains of service nodes and attaching the service nodes to the left network 60 or right network 62, orchestration engine 20 pre-configures each of the service nodes 10A-10B by, for each service node, spawning a left network 700, a right network 702, and then spawning a VM that executes an instance of a VNF on the service node 10. The orchestration engine 20 further boots the VM, and applies basic configuration to the VM instance such that the VM is executing a particular instance of a VNF. For example, orchestration engine 20 spawns left network 700A attached to service node 10A, then spawns right network 702A attached to service node 10A, and then spawns and configures a VNF on service node 10A. Further, orchestration engine 20 spawns left network 700B attached to service node 10B, then spawns right network 702B attached to service node 10B, and then spawns and configures a VNF on service node 10B.

Upon receiving a request for network services from subscriber device 16, orchestration engine 20 determines the necessary VNFs and an ordering required to create a composite network service capable of servicing the request. Based on the determination, orchestration engine 20 selects service nodes from a pool 61 of service nodes, and instructs SDN controller 19 to update forwarding information of the service nodes and/or switch fabric to dynamically create a service chain using the selected service nodes executing the required VNFs. In the example of FIG. 7, orchestration engine 20 forms the service chain by issuing instructions to SDN controller 19 causing SDN controller 19 to update the routing and switching infrastructure of service provider core 7 such that the egress traffic of right network 702A of service node 10A is forwarded to the ingress of right network 700B of service node 10B. Furthermore, orchestration engine 20 issues instructions to SDN controller 19 causing SDN controller 19 to update the routing and switching infrastructure of service provider core 7 such that the egress traffic of right network 702B of service node 10B is forwarded to the customer exit virtual routing and forwarding (VRF) point 706 of service provider core 7. Orchestration engine 20 further issues instructions to SDN controller 19 causing SDN controller 19 to update the routing and switching infrastructure of service provider core 7 such that the egress traffic of customer entry VRF 704 is forwarded to the ingress of left network 702A of service node 10A. Finally, Orchestration engine 20 issues instructions to SDN controller 19 causing SDN controller 19 to update the routing and switching infrastructure of service provider core 7 such that the network traffic from subscriber device 16, received at customer entry gateway 710 is forwarded to the customer entry VRF 704.

The architecture of the network illustrated in FIG. 7 is shown as an example. The techniques as set forth in this disclosure may be implemented in the example network of FIG. 7, as well as other types of networks not described specifically herein. Nothing in this disclosure should be construed so as to limit the techniques of this disclosure to the example architecture illustrated by FIG. 7.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
 prior to receiving a request to perform a network service on network traffic from a subscriber device:
  spawning, by an orchestration engine of a service provider network, a plurality of virtual network functions (VNFs) executed by virtual machines on a plurality of service nodes; and
  assigning, by the orchestration engine, the plurality of service nodes to a plurality of service node pools, wherein each service node pool of the plurality of service node pools comprises idle service nodes that execute a particular type of VNF; and in response to receiving the request to perform the network service on network traffic from the subscriber device:

selecting, by the orchestration engine, one or more service nodes from one or more service node pools of the plurality of service node pools required to perform the requested network service;

issuing instructions, by the orchestration engine, causing a software-defined network (SDN) controller of the service provider network to attach the selected one or more service nodes to the switch fabric of the service provider network to form a service chain providing the requested network service; and issuing instructions, by the orchestration engine, causing the SDN controller to direct network traffic through the service chain so as to perform the requested network service on network traffic from the subscriber device.

2. The method of claim 1, wherein selecting the one or more service nodes from the one or more service node pools of the plurality of service node pools required to perform the requested network service comprises:

determining, by the orchestration engine, one or more types of VNFs required to perform the requested network service;

determining, by the orchestration engine, one or more service node pools, wherein each of the one or more service node pools contains idle service nodes that execute one type of the one or more types of VNFs required to perform the requested network service; and selecting, by the orchestration engine, one or more service nodes from the one or more service node pools, wherein the one or more service nodes execute the one or more types of VNFs required to perform the requested network service.

3. The method of claim 1, further comprising:

prior to receiving the request to perform the network service on network traffic from the subscriber device, applying, by the orchestration engine, non-customer-specific configuration to the plurality of VNFs; and in response to receiving the request to perform the network service on network traffic from the subscriber device, applying, by the orchestration engine, customer-specific configuration to the selected at least one service node.

4. The method of claim 1, further comprising:

issuing instructions, by the orchestration engine, causing the SDN controller to direct network traffic away from the service chain;

issuing instructions, by the orchestration engine, causing the SDN controller to detach the selected at least one service node from the switch fabric of the service provider network; and returning, by the orchestration engine, the one or more service nodes to the corresponding one or more service node pools of the plurality of service node pools.

5. The method of claim 1, wherein the one or more service nodes from the one or more service node pools of the plurality of service node pools comprises a first service node from a first service node pool of the plurality of service node pools and a second service node from a second service node pool of the plurality of service node pools, and wherein the first service node and the second service node execute different VNFs.

6. The method of claim 1, wherein attaching the selected one or more service nodes to the switch fabric of the service provider network to form the service chain providing the requested network service comprises attaching an ingress and an egress of the selected one or more service nodes to the switch fabric of the service provider network to form the service chain providing the requested network service.

7. The method of claim 1, further comprising configuring, by the orchestration engine, the selected one or more service nodes to leave a power-conservation mode and enter a full power mode in response to receiving the request to perform the network service on network traffic from the subscriber device.

8. The method of claim 1, further comprising obtaining, by the orchestration engine, a license for the selected one or more service nodes in response to receiving the request to perform the network service on network traffic from the subscriber device.

9. A method comprising:

prior to receiving a request to perform a network service on network traffic from a subscriber device:

spawning, by an orchestration engine of a service provider network, a plurality of virtual network functions (VNFs) executed by virtual machines on a plurality of service nodes;

issuing instructions, by the orchestration engine, causing a Software-defined Network (SDN) controller of the service provider network to attach the plurality of service nodes together to form a plurality of service chains providing a plurality of different network services; and assigning, by the orchestration engine, each of the plurality of service chains to a plurality of service chain pools, wherein each service chain pool of the plurality of service chain pools comprises idle service chains offering a particular type of network service of the plurality of different network services; and in response to receiving the request to perform the network service on network traffic from the subscriber device:

selecting, by the orchestration engine, a service chain from a service chain pool of the plurality of service chain pools, wherein the selected service chain provides the requested network service;

issuing instructions, by the orchestration engine, causing the SDN controller to attach the selected service chain to the switch fabric of the service provider network; and issuing instructions, by the orchestration engine, causing the SDN controller to direct network traffic through the selected service chain.

10. The method of claim 9, wherein selecting the service from the service chain pool of the plurality of service chain pools, wherein the selected service chain provides the requested network service comprises:

determining, by the orchestration engine, a service chain that performs the requested network service;

selecting, by the orchestration engine, a service chain pool of the plurality of service chain pools, wherein the service chain pool contains idle service chains that performs the requested network service; and selecting, by the orchestration engine, a service chain from the selected service chain pool, wherein the selected service chain that performs the requested network service.

11. The method of claim 9, further comprising:
prior to receiving the request to perform the network service on network traffic from the subscriber device, applying, by the orchestration engine, non-customer-specific configuration to the plurality of VNFs; and
in response to receiving the request to perform the network service on network traffic from the subscriber device, applying, by the orchestration engine, customer-specific configuration to the plurality of service nodes that form the selected service chain.

12. The method of claim 9, further comprising:
issuing instructions, by the orchestration engine, causing the SDN controller to direct network traffic away from the selected service chain;
issuing instructions, by the orchestration engine, causing the SDN controller to detach the selected service chain from the switch fabric of the service provider network; and
returning, by the orchestration engine, the selected service chain to the corresponding service chain pool of the plurality of service chain pools.

13. The method of claim 9, wherein a first service chain of a first service chain pool of the plurality of service chain pools and a second service chain of a second service chain pool of the plurality of service chain pools, and wherein the first service chain and the second service chain provide different network services.

14. The method of claim 9, wherein attaching the selected service chain to the switch fabric of the service provider network comprises attaching an ingress and an egress of the selected service chain to the switch fabric of the service provider network to form a networking path such that network traffic from the subscriber device may flow through the selected service chain.

15. The method of claim 9, further comprising configuring, by the orchestration engine, the plurality of service nodes forming the selected service chain to leave a power-conservation mode and enter a full power mode in response to receiving the request to perform the network service on network traffic from the subscriber device.

16. The method of claim 9, further comprising obtaining, by the orchestration engine, a license for each of the plurality of service nodes forming the selected service chain in response to receiving the request to perform the network service on network traffic from the subscriber device.

17. An orchestration engine of a service provider network executed by a one or more processors and configured to:
prior to receiving a request to perform a network service on network traffic from a subscriber device:
spawn a plurality of virtual network functions (VNFs) executed by virtual machines on a plurality of service nodes; and
assign the plurality of service nodes to a plurality of service node pools, wherein each service node pool of the plurality of service node pools comprises idle service nodes that execute a particular type of VNF; and
in response to receiving the request to perform the network service on network traffic from the subscriber device:
select one or more service nodes from one or more service node pools of the plurality of service node pools required to perform the requested network service;
issue instructions to a Software-Defined Network (SDN) controller of the service provider network to attach the selected one or more service nodes to the switch fabric of the service provider network to form a service chain providing the requested network service; and
issue instructions to the SDN controller to direct network traffic through the service chain so as to perform the requested network service on network traffic from the subscriber device.

18. The orchestration engine of claim 17, wherein the orchestration engine is further configured to select the one or more service nodes from the one or more service node pools of the plurality of service node pools by:
determining one or more types of VNFs required to perform the requested network service;
determining one or more service node pools, wherein each of the one or more service node pools contains idle service nodes that execute one type of the one or more types of VNFs required to perform the requested network service; and
selecting one or more service nodes from the one or more service node pools, wherein the one or more service nodes execute the one or more types of VNFs required to perform the requested network service.

19. The orchestration engine of claim 18, wherein the orchestration engine is further configured to:
prior to receiving the request to perform the network service on network traffic from the subscriber device, apply non-customer-specific configuration to the plurality of VNFs; and
in response to receiving the request to perform the network service on network traffic from the subscriber device, apply customer-specific configuration to the selected at least one service node.

20. An orchestration engine of a service provider network executed by a one or more processors and configured to:
prior to receiving a request to perform a network service on network traffic from a subscriber device:
spawn a plurality of virtual network functions (VNFs) executed by virtual machines on a plurality of service nodes;
issue instructions to a Software-Defined Network (SDN) controller of the service provider network to attach the plurality of service nodes together to form a plurality of service chains providing a plurality of different network service; and
assign each of the plurality of service chains to a plurality of service chain pools, wherein each service chain pool of the plurality of service chain pools comprises idle service chains offering a particular type of network service of the plurality of different network service; and
in response to receiving the request to perform the network service on network traffic from the subscriber device:
select a service chain from a service chain pool of the plurality of service chain pools, wherein the selected service chain provides the requested network service;
issue instructions to the SDN controller to attach the selected service chain to the switch fabric of the service provider network; and
issue instructions to the SDN controller to direct network traffic through the selected service chain.

21. The orchestration engine of claim 20, wherein the orchestration engine is further configured to select the service chain from the service chain pool of the plurality of service chain pools, wherein the selected service chain provides the requested network service, by:

determining a service chain that performs the requested network service;

selecting a service chain pool of the plurality of service chain pools, wherein the service chain pool contains idle service chains that performs the requested network service; and selecting a service chain from the selected service chain pool, wherein the selected service chain that performs the requested network service.

22. The orchestration engine of claim 20, wherein the orchestration engine is further configured to:

prior to receiving the request to perform the network service on network traffic from the subscriber device, apply non-customer-specific configuration to the plurality of VNFs; and in response to receiving the request to perform the network service on network traffic from the subscriber device, apply customer-specific configuration to the plurality of service nodes that form the selected service chain.

* * * * *